US010491031B2

(12) United States Patent
Rooijackers et al.

(10) Patent No.: US 10,491,031 B2
(45) Date of Patent: Nov. 26, 2019

(54) APPARATUS AND ASSOCIATED METHOD FOR BATTERY CHARGING

(71) Applicant: NXP B.V., Eindhoven (NL)

(72) Inventors: Cornelis Jozef Petrus Maria Rooijackers, Waalre (NL); Peter Theodorus Johannes Degen, Arnhem (NL)

(73) Assignee: NXP B.V., Eindhoven (NL)

( * ) Notice: Subject to any disclaimer, the term of this patent is extended or adjusted under 35 U.S.C. 154(b) by 136 days.

(21) Appl. No.: 15/644,897

(22) Filed: Jul. 10, 2017

(65) Prior Publication Data

US 2018/0019612 A1 Jan. 18, 2018

(30) Foreign Application Priority Data

Jul. 12, 2016 (EP) ..................................... 16179044

(51) Int. Cl.
*H02J 7/16* (2006.01)
*H02J 7/04* (2006.01)
*H02J 7/00* (2006.01)
*H02J 7/02* (2016.01)

(52) U.S. Cl.
CPC ............ *H02J 7/045* (2013.01); *H02J 7/0047* (2013.01); *H02J 7/0036* (2013.01); *H02J 7/0052* (2013.01); *H02J 7/022* (2013.01); *H02J 2007/0062* (2013.01)

(58) Field of Classification Search
USPC .......................... 320/162, 163, 107, 108, 128
See application file for complete search history.

(56) References Cited

U.S. PATENT DOCUMENTS

| 4,746,854 A | * | 5/1988 | Baker | H02J 7/0073 320/130 |
| 6,472,849 B1 | | 10/2002 | Smith | |
| 2008/0297112 A1 | * | 12/2008 | Cordes | H02J 7/0073 320/128 |
| 2011/0273145 A1 | * | 11/2011 | Yamakita | H01M 10/44 320/163 |
| 2013/0063078 A1 | | 3/2013 | Nishida | |
| 2013/0238819 A1 | | 9/2013 | Oljaca et al. | |
| 2014/0125131 A1 | * | 5/2014 | Lalitnuntikul | G06F 1/266 307/31 |

(Continued)

FOREIGN PATENT DOCUMENTS

WO WO-2015/110584 A1 7/2015

*Primary Examiner* — Brian Ngo

(57) ABSTRACT

An apparatus configured to,
in respect of an electronic device comprising a battery for powering the electronic device and a charger configured to receive a mains power supply and, when connected to the electronic device, provide a power output to charge the battery,
based on a determination of a failure of a request to increase the power output of the charger to the battery of the electronic device, the failure comprising where at least a requested increase of the power output of the charger by a first predetermined amount fails to yield an increase in the power output of the charger equal to the first predetermined amount within a threshold amount,
provide an indication to the electronic device that the charger is disconnected from the mains power supply for causing the electronic device to indicate that the charger is disconnected from the mains power supply to a user of the electronic device.

15 Claims, 3 Drawing Sheets

(56) References Cited

U.S. PATENT DOCUMENTS

| | | | |
|---|---|---|---|
| 2014/0266005 A1 | 9/2014 | Havass et al. | |
| 2014/0306650 A1* | 10/2014 | Akiyoshi | H01M 10/44 320/107 |
| 2015/0097442 A1* | 4/2015 | Muurinen | H04B 5/0037 307/104 |
| 2015/0130623 A1* | 5/2015 | Robison | G08B 21/18 340/636.1 |
| 2015/0244201 A1* | 8/2015 | Chu | H02J 7/025 320/108 |
| 2016/0087690 A1* | 3/2016 | Tsukamoto | H04B 5/0037 307/104 |
| 2016/0156229 A1* | 6/2016 | Sakata | H02J 5/0037 307/104 |
| 2017/0047764 A1* | 2/2017 | Lee | H02J 7/0042 |
| 2017/0047784 A1* | 2/2017 | Jung | H02J 50/12 |
| 2017/0331400 A1* | 11/2017 | Saha | H02P 27/06 |
| 2017/0349056 A1* | 12/2017 | Jang | H02J 7/0031 |

\* cited by examiner

Figure 4

401 — Based on a determination of a failure of a request to increase the power output of the charger to the battery of the electronic device, the failure comprising where at least a requested increase of the power output of the charger by a first predetermined amount fails to yield an increase in the power output of the charger substantially equal to the first predetermined amount within a threshold amount, 402 — Provide for an indication to the electronic device to indicate that the charger is disconnected from the mains power supply.

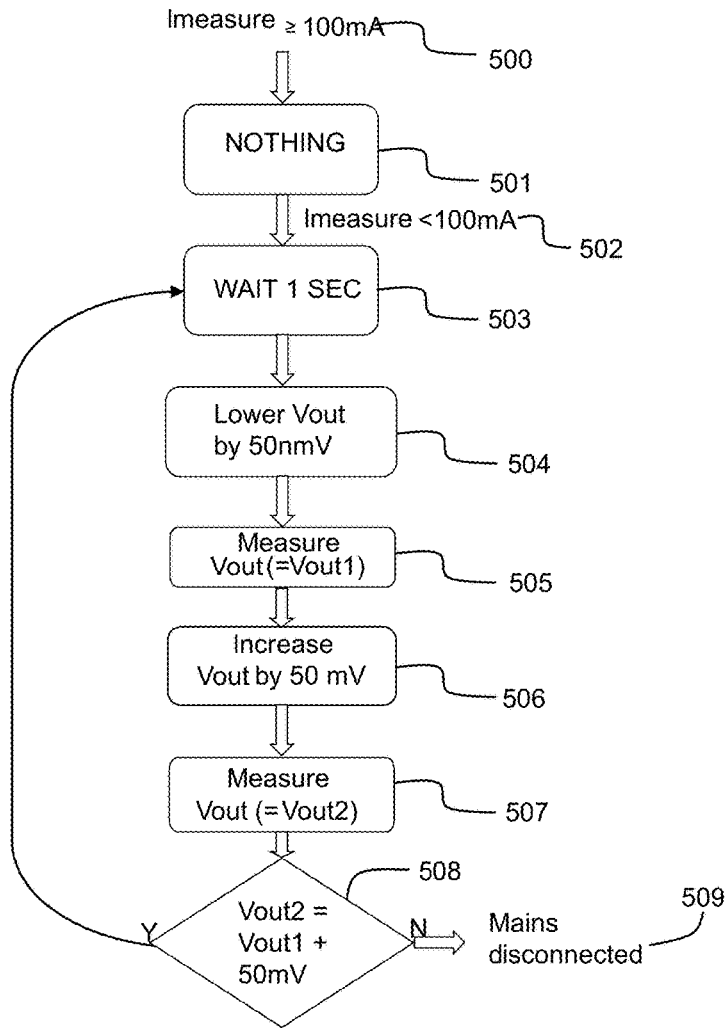

Figure 5

APPARATUS AND ASSOCIATED METHOD FOR BATTERY CHARGING

CROSS-REFERENCE TO RELATED APPLICATIONS

This application claims the priority under 35 U.S.C. § 119 of European patent application no. 16179044.9, filed Jul. 12, 2016 the contents of which are incorporated by reference herein.

The present disclosure relates to an apparatus configured to, based on a determination that a charger is disconnected from a mains power supply, provide an indication to an electronic device. The disclosure also relates to a charger for a battery including such an apparatus. The disclosure also relates to an electronic device containing a battery for charging by a charger including such an apparatus.

According to a first aspect of the present disclosure there is provided an apparatus configured to,
  in respect of an electronic device comprising a battery for powering the electronic device and a charger configured to receive a mains power supply and, when connected to the electronic device, provide a power output to charge the battery,
  based on a determination of a failure of a request to increase the power output of the charger to the battery of the electronic device, the failure comprising where at least a requested increase of the power output of the charger by a first predetermined amount fails to yield an increase in the power output of the charger equal to the first predetermined amount within a threshold amount,
  provide an indication to the electronic device that the charger is disconnected from the mains power supply for causing the electronic device to indicate that the charger is disconnected from the mains power supply to a user of the electronic device.

In one or more examples, the charger and electronic device are configured such that a power output of the charger is configured to be connected directly to the battery. Thus, in one or more examples, when the charger and the electronic device are connected together, a direct connection is provided between power output terminals of the charger and terminals of the battery. In one or more examples, the power output of the charger is controlled by a controller of the charger, the controller configured to receive power from the power output of the charger and, in the event of disconnection of the charger from the mains power supply, receive power from the battery. In one or more examples, the threshold amount is less than 50% of the requested increase.

In one or more embodiments, based a determination of a success of the request to increase the power output of the charger to the battery of the electronic device, the apparatus is configured to provide an indication to the electronic device that the charger is connected to the mains power supply. In one or more embodiments, the electronic device may presume a mains power supply connection unless informed otherwise, and based on the success of the request to increase the power output, the apparatus may provide no indication to the electronic device that the charger is connected to the mains power supply.

In one or more embodiments the power output to charge the battery is controlled by a controller of the charger, and the requested increase comprises a requested increase to the controller.

In one or more embodiments the requested increase is effected by control of the electronic device to increase a draw of current thereto.

In one or more examples, the increase in the current draw of the electronic device is effected by control of a DC/DC convertor of the electronic device. In one or more examples, where the apparatus is part of the charger, the requested increase may comprise a message sent to the electronic device to cause the control of the DC/DC convertor.

In one or more embodiments, the provision of the indication is further based on a requested decrease of the power output of the charger by a second predetermined amount, followed by the requested increase and the apparatus is configured to provide for the signalling based on determination that the power output of the charger fails to increase substantially by the first predetermined amount from a first power output measured after the requested decrease to a second power output measured after the requested increase.

In one or more embodiments, the first predetermined amount and the second predetermined amount are the same.

In one or more embodiments, the requested decrease and requested increase are performed periodically. In one or more examples, the period is less than 2 seconds or substantially 1 second.

In one or more embodiments, the apparatus is configured to perform one or more of;
  i) where the power output to charge the battery is controlled by a controller of the charger, the requested decrease comprises a requested decrease to the controller; and
  ii) the requested decrease is effected by control of the electronic device to decrease a draw of current thereto.

In one or more examples, to provide the requested increase and/or the requested decrease in the power output, the apparatus is configured to provide signalling to one or more of;
  a controller of the charger to effect the change in output power of the charger;
  circuitry of the electronic device to change the draw of power from the charger.

In one or more embodiments, the first power output measured after the requested decrease comprises a voltage measurement and the second power output measured after the requested increase comprises a voltage measurement. In one or more examples, the first power output measured after the requested decrease comprises a current measurement and the second power output measured after the requested increase comprises a current measurement.

In one or more embodiments, the apparatus forms part of the charger.

In one or more embodiments, the apparatus forms part of the electronic device.

In one or more embodiments, the apparatus is configured such that the determination of a failure of a request to increase a power output of the charger is performed in response to a measured current flow between the charger and the battery of the electronic device being below a threshold current.

In one or more embodiments, the power output of the charger is controlled by a controller of the charger, and the charger is configured to provide the controller with power and configured such that when connected to the electronic device and charging the battery, the charger and thereby the controller is provided with a connection such that it can receive power from the battery.

In one or more embodiments, following the determination of the failure of the request to increase the power output of the charger to the battery of the electronic device, the apparatus is configured to provide for the indication based on a detected voltage drop of at least a predetermined voltage-drop-threshold upon opening of a load switch that interrupts the connection between the charger and the battery.

In one or more embodiments, following the determination of the failure of the request to increase the power output of the charger to the battery of the electronic device, the apparatus is configured to; provide signalling to cause the opening of a load switch that interrupts the connection between the charger and the battery, and, with the load switch open provide a request to increase the power output of the charger to the battery of the electronic device, wherein upon failure of the requested increase of the power output of the charger to yield a corresponding increase in the power output of the charger within a threshold amount, said indication to the electronic device is provided.

In one or more embodiments, upon success of the requested increase of the power output of the charger to yield a corresponding increase in the power output of the charger within the threshold amount, the apparatus is configured to provide signalling to cause the closing of the load switch.

In one or more embodiments, the provision of an indication to the electronic device is provided by one or more of;
  a message provided to the electronic device indicative of the charger being disconnected from the mains power supply;
  cessation of one or more messages provided to the electronic device indicative of the charger being connected to the mains power supply.

In one or more examples, providing the indication allows the electronic device, on receiving the indication, to indicate to the user that charging has ceased due to the fact that the charger is disconnected from the mains power supply.

In one or more examples, the electronic device comprises a portable electronic device, a laptop computer, a mobile phone, a smartphone, a tablet computer, a personal digital assistant, a digital camera, a smartwatch, a non-portable electronic device or a wearable electronic device.

According to a second aspect of the disclosure, we provide a method configured to perform the steps of:
  in respect of an electronic device comprising a battery for powering the electronic device and a charger configured to receive a mains power supply and, when connected to the electronic device, provide a power output to charge the battery,
  based on a determination of a failure of a request to increase the power output of the charger to the battery of the electronic device, the failure comprising where at least a requested increase of the power output of the charger by a first predetermined amount fails to yield an increase in the power output of the charger equal to the first predetermined amount within a threshold amount,
  providing an indication to the electronic device that the charger is disconnected from the mains power supply for causing the electronic device to indicate that the charger is disconnected from the mains power supply to a user of the electronic device.

According to a third aspect of the disclosure, we provide a computer program or computer readable medium comprising computer program code stored thereon, the computer readable medium and computer program code being configured to, when run on at least one processor, perform the method of:
  in respect of an electronic device comprising a battery for powering the electronic device and a charger configured to receive a mains power supply and, when connected to the electronic device, provide a power output to charge the battery,
  based on a determination of a failure of a request to increase the power output of the charger to the battery of the electronic device, the failure comprising where at least a requested increase of the power output of the charger by a first predetermined amount fails to yield an increase in the power output of the charger equal to the first predetermined amount within a threshold amount,
  providing an indication to the electronic device that the charger is disconnected from the mains power supply for causing the electronic device to indicate that the charger is disconnected from the mains power supply to a user of the electronic device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which:

FIG. 4 shows a flowchart illustrating an example method;

FIG. 5 shows a second flowchart illustrating a first embodiment of the example method.

Figure 1:
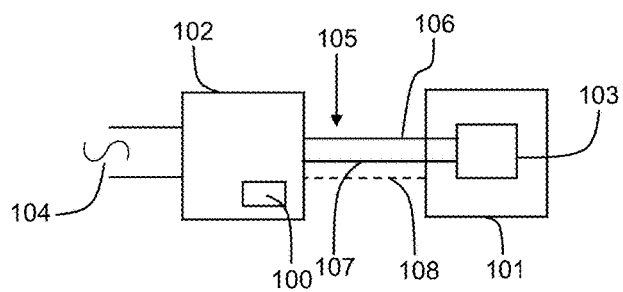
FIG. 1 shows an example embodiment of an apparatus and charger and electronic device.

FIG. 1 shows an apparatus 100 configured to provide an indication to an electronic device 101 to indicate when a charger 102 configured to charge a battery 103 of the electronic device 101 is disconnected from a mains power supply 104. The electronic device 101 includes the battery 103 for powering the electronic device 101. The battery, in one or more examples, may comprise an electrochemical battery, super capacitor or other energy storage device. In this example the charger 102 and the electronic device are configured to be releasably coupled to one another when charging of the battery 103 is required. Accordingly, a cable 105 may be provided to transfer the power output by the charger 102 to the electronic device 103. A first end of the cable 105 and charger 102 and a second end of the cable 105 and electronic device 101 may include complimentary parts of a physical and electrical connection means (not shown), such as terminals and clips or a plug and socket configuration, to retain the ends of the cable in physical and electrical connection with the charger and electronic device, when connected together. The cable 105 may include power lines 106, 107 for transferring power between the charger 102 and the battery 103 as well as one or more data lines 108 for data communication between the electronic device 101 and the charger 102.

In one or more examples, the electronic device 101 is a portable (such as hand-held portable) electronic device which may comprise a mobile telephone or tablet computer, for example. The charger 100 comprises a mains powered charger. Accordingly, the charger may include a power converter 200 (shown in more detail in FIGS. 2 and 3) for receiving Alternating Current (AC) mains power from the mains power supply and providing an output power, such as Direct Current (DC), of an appropriate voltage for charging the battery 103 of the electronic device 101.

Users of electronic devices such as 101 are using them much more frequently and therefore need to recharge the battery 103 more frequently. It is desirable for the battery to be charged in a short period of time. To reduce the charging time of the battery, the charge current has to be increased. However, with increased charging currents, losses due to the resistance of the cable, connectors and switches between the charger and the battery, can increase. Such losses may further cause heat dissipation in the charger, cable and electronic device. It has been found that to ensure electronic devices can remain compact and not damaged by excess heat due to charging dissipation losses need to be controlled. Therefore, it is desirable that when charging the battery 103 with a high current, the battery 103 is directly connected to the output of the charger 102. In one or more examples, the charger 102 and electronic device 101 are configured for "direct charging". Accordingly, the power output of the charger is applied directly to the terminals of the battery, such as without further power conversion (e.g. by a power convertor of the electronic device). It is known that to assure that the power output of the charger output is set to the desired voltage and current levels, a communication protocol between the phone and charger may be used before the battery is directly connected to the charger output. As an example only such a communication protocol may comprise the Quick Charge (QC) protocol, which may use the data line 108 for communication between the electronic device 101 and the charger 102.

The electronic device 101 is configured to indicate to a user that the charger 102 is connected to the electronic device 101 and is also charging the battery 103. As soon as the charger 102 is disconnected from the electronic device 101 or from the mains power supply 104, the charging of the battery will be stopped and should be indicated to the user of the electronic device 101.

The apparatus 100 is configured to provide an indication to the electronic device 101 so that the electronic device can indicate whether or not the charger is connected to the mains power supply 104. It is described below how the apparatus 100 may achieve the determination of the status of the mains power supply connection.

In FIG. 1, the apparatus 100 is shown as part of the charger 102. However, it will be appreciated that the apparatus may alternatively be part of the electronic device 101 or distributed between the electronic device and the charger. In one or more examples, where the apparatus 100 forms part of the electronic device 101, the data line 108 may be used to provide for any control and/or requests of the charger that may be required depending on how the apparatus 100 is configured to operate.

For chargers 102 and electronic devices 101 that use a direct charging method where the battery 103 is directly connected to the charger 102, the battery 103 is normally charged with a high current to assure a low charging time. When the battery 103 is almost full, the current from the charger 102 to the battery 103 is reduced. The charge current may reduce to such a level that it cannot be measured (or accurately measured) by the charger 102 or by the electronic device 101. When at that time the charger 102 is disconnected from the mains power supply 104 and as a consequence of the direct connection between the power output of the charger 102 and the battery 103, the battery 103 may provide power to the charger 102 due to the direct connection. This power or reverse current supplied to the charger 102 may be received by a controller 201 (shown in FIGS. 2 and 3) of the charger 102. This reverse current is also typically small and may not be measured (or accurately measured) by the charger 102 or by the electronic device 101.

As a result the electronic device 101 may not receive any indication that the charger 102 is disconnected from the mains power supply 104 (through communication with the controller 201) and therefore may not be able to indicate to the user that the charging of the battery 103 has stopped, while the user can clearly see that the charger is disconnected from the mains power supply.

The electronic device 101 may be informed of the disconnection of the charger 102 from the mains power supply 104 by way of measurement of the voltage applied to the charger 102 by the mains power supply 104. However, to effect this method the charger 102 requires additional circuitry to measure the mains input voltage or a derivative that is related to the mains input voltage. This requires additional components in the charger, which may increase the size and/or complexity of the charger 102 and adds costs. In one or more examples described in more detail below, the apparatus 100 provides for determination of the status of the mains power supply connection to the charger 102 without measurement of the mains input voltage.

Figure 2:
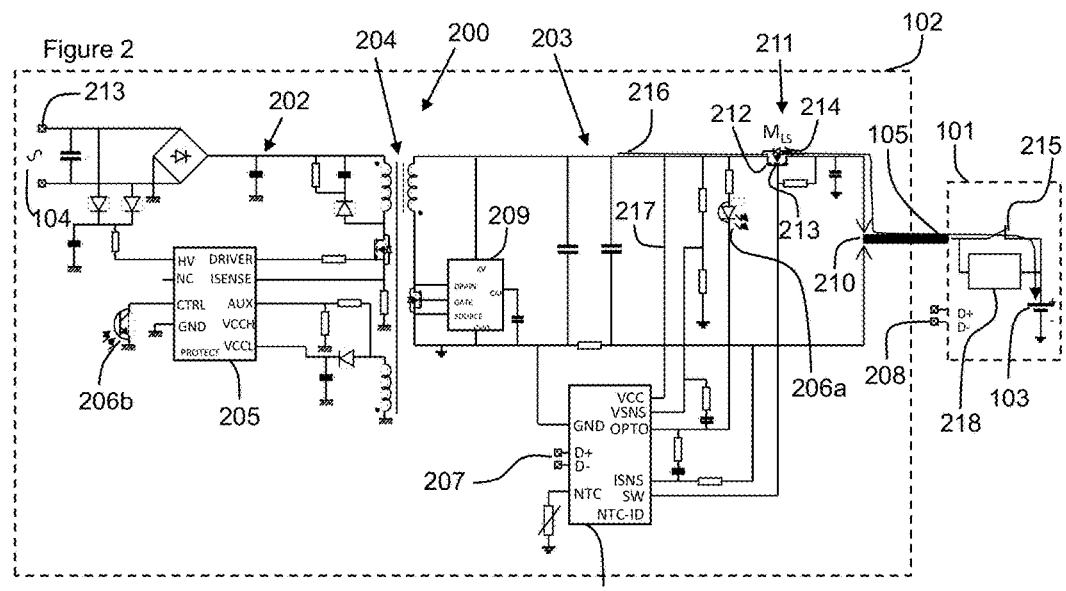
FIG. 2 shows a more detailed view of the example embodiment of FIG. 1 in a first state where the charger is connected to the mains power supply.

FIG. 2 shows the charger 102 and the electronic device 101 in more detail. In this example, the charger comprises a power converter 200, such as a switched mode power supply, including a primary side 202 and a secondary side 203 connected by a transformer 204. The primary side 202 includes a primary controller 205 associated with the primary side and the secondary controller 201 associated with the secondary side. The power converter 200 may include a secondary side synchronous rectifier 209, to improve the efficiency of the converter. The primary and secondary controllers 205, 201 may be coupled, such as by an optocoupler 206a, 206b, and provide for a feedback signal to be at least sent to the primary controller 205 for regulating the voltage and/or current output and also for controlling the voltage and/or output of the charger.

The output voltage of the charger 102 and the maximum output current of the charger 102 may be set and controlled by the secondary controller 201. Further, the output voltage of the power convertor 200 and therefore the charger 102 may be set via a negotiation between the charger 102 and the electronic device 101. Data terminals 207 of the secondary controller 201 and data terminals 208 of the electronic device 101 may be connected by the data line 108 for communication therebetween. Communication between the secondary controller 201 and the electronic device 101 may be effected using a particular communication protocol. Communication protocols include USB Power Delivery (USB-PD), Quick Charge (QC), HiSilicon (HS), AFC and FCP.

The power output from the transformer 204 is provided as the power output of the charger 102 at a charger output terminal 210 at a terminal end of an output line which includes a load switch 211. The load switch 211 may provide for connection and interruption of the supply of power from the charger 102 to the electronic device 101. In this example, the load switch 211 comprises a transistor based switch, such as a NMOST (n-type MOS transistor) switch 212 having a first terminal (drain) connected to the secondary side 203 of the transformer 204 and a second terminal (source) connected to the output terminal 210. The conductivity of the transistor switch is controlled in response to a signal applied at a control terminal 213 (gate) of the NMOST switch 212, which is supplied by the secondary controller 201. A characteristic of the load switch, such as when the load switch is embodied as an NMOST switch, is that it may conduct if the second terminal (source) has a higher voltage than the first terminal (drain). Accordingly, the load switch is shown in the figures with a back gate diode 214 with its cathode connected to the first terminal of the NMOST switch 212 and its anode to the second terminal of the NMOST switch 212. It will be appreciated that in one or more examples the backgate diode may not be physically present but represent an inherent property of the load switch or in one or more examples it may be physically present.

Turning to the primary side 202, the power convertor 200 includes mains supply terminals 213 to receive the AC mains supply voltage as the input to the power converter. As mentioned above, the power converter 200 may be a switched mode power supply. Accordingly, the power converter typically includes a rectifier, one or more switching elements to reconfigure current paths therein and charge one or more charge storage elements. The rectified voltage of the supply and the voltage across the charge storage elements is applied to the transformer 204 for transfer to the secondary side 203, as will be familiar to those skilled in the art. The primary controller 205 is typically configured to control the switching element(s) in response to the feedback signal received from the secondary controller 207 to provide for different voltage levels at the charger output terminal 210 and/or regulation of the voltage/current output.

In FIG. 2 the apparatus 100 is embodied as firmware within the secondary controller 201. However, in one or more examples the apparatus is embodied in hardware in the charger or the electronic device or as software executed by a processor with associated memory of the charger or electronic device. The configuration and operation of the apparatus 100 will now be described. In one or more examples, the principle of operation of the apparatus 100 is to provide an indication that the charger is disconnected from the mains power supply on determination that the charger 102 is incapable of providing an increase in power output following a request for an increase in output power, wherein said request may be effected by a request to the secondary controller 201 to increase the output power and/or by a manipulation of circuitry of the electronic device to draw more power.

Turning to the electronic device 101, the power received from the charger 102 via the cable 105 may be received by the battery 103 directly once a direct charge switch 215 is closed or, when the direct charge switch 215 is open via a power converter 218, such as a DC-DC convertor. Thus, during direct charging, power received from the charger 102 may be applied directly to the battery 103 without power conversion by the electronic device.

In use, the electronic device 103 may inform the secondary controller 201 via the data terminals 208, 207 using a particular protocol of the desired output voltage and/or output current of the charger 102. The desired output voltage and/or output current may be substantially equal to a suitable charging level for the battery, which may be predetermined or determined based on the current state of charge of the battery. The electronic device 102 may then close the direct charge switch 215 so that the charge current from the charger to the battery can be increased. It will be appreciated that to improve efficiency one or more of the switches and any resistors shown in FIG. 2 may be low ohmic.

The secondary controller 201 may then provide the negotiated output voltage and/or output current. It will be appreciated that in one or more examples, no negotiation of one or both of the voltage and current may occur and default values may be used. For example, the output voltage may be 5V and the output current may be 2 A. The secondary controller 201 may be configured to detect a malfunctions, such as too high a temperature within the charger 201 and in response thereto may actuate the load switch 211 to interrupt the supply of power to the electronic device 101.

FIG. 2 shows a first state in which the charger 102 is connected to the mains supply 104 and an arrow 216 shows the flow of power from the charger 102 directly to the battery 103. The secondary controller 201 is provided with power to its Vcc terminal 304 from the output line extending from the transformer 204 to the charger output terminal 210 via a connection 217.

Figure 3:
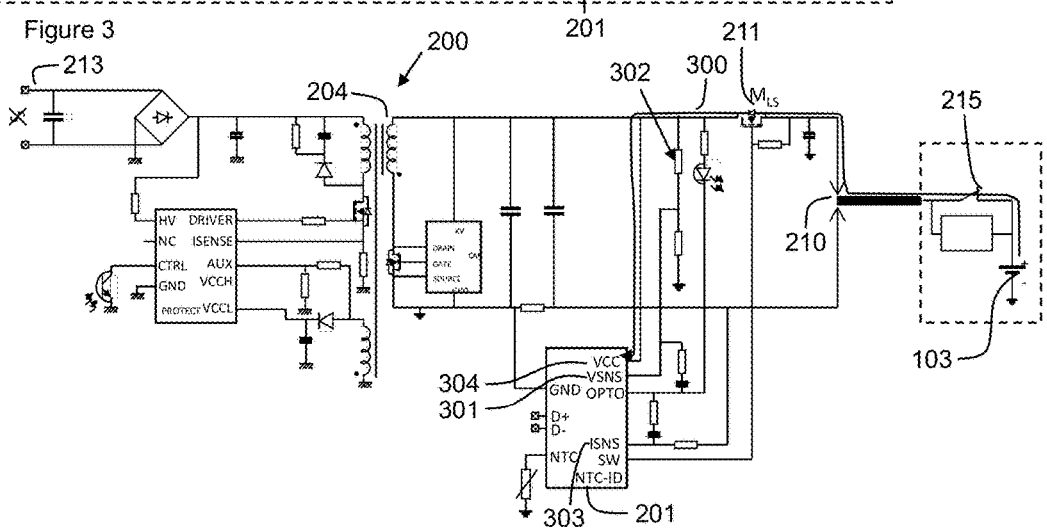
FIG. 3 shows a more detailed view of the example embodiment of FIG. 1 in a second state where the charger is not connected to the mains power supply.

FIG. 3 shows a second state in which the charger 102 is disconnected from the mains supply 104. At high current flows between the charger 102 and the electronic device 101, the fall in current supplied by the charger 102 on disconnection from the mains power supply 104 may be used to provide an indication to the electronic device of the connection state of the charger to the mains power supply. However, in particular although not exclusively, at low current flows such as below a threshold current, such as when the battery is almost charged, any change in current flow due to disconnection from the mains power supply 104 may not be readily or accurately measured. For example, a low current flow (threshold current) may be less than 250 mA, 200 mA, 150 mA, 100 mA, 75 mA, 50 mA or 25 mA. Accordingly, determining when a disconnection from the mains power supply occurred is problematic.

In the second state, the secondary controller 201 receives power to its Vcc terminal via line 217, which connects to the output 210 of the power converter 200 through the load switch 211 and, when the direct charge switch 215 of the electronic device 101 is closed, to the battery 103. Accordingly, without the mains power supply connected, power to the secondary controller is provided by the voltage supplied by the battery 103. Arrow 300 shows the power flow from the battery 103 to power the secondary controller 201 via the Vcc pin 304.

The secondary controller 201 is not able to determine directly whether its power is supplied by the power converter 200 or the battery 103.

The apparatus 100 is configured to provide for an indication to the electronic device 101, such as by the protocol over data line 108, to indicate that the charger 102 is disconnected from the mains power supply 104. The signalling provided to the electronic device 101 is provided based on a determination of a failure of a request to increase the power output of the charger 102 to the battery 103 of the electronic device 101. Thus, in one or more examples, the apparatus 100 is configured to attempt to increase the power output and, in particular, the voltage output of the power converter 200 and if the power output fails to respond to the requested increase, this is deemed indicative of the charger 102 being disconnected from the mains power supply 104.

Thus, if, as in this example, the apparatus 100 is embodied in the secondary controller 201, the apparatus 100 (or other apparatus) may request an increase in the power output of the charger, such as using the charging protocol of the secondary controller 201 described above or by manipulation of the feedback signal sent between the secondary and primary controllers 201, 203 (embodied, in part, as optocoupler 206a, 206b). The increase in the power output may be by a first predetermined amount which may be less than 200 mV, 150 mV, 100 mV, 75 mV, 60 mV, 50 mV or about 50 mV. In one or more examples, the first predetermined amount may be related to a measurement of (or predetermined measurement of) the output voltage ripple of the charger, such that the change may be distinguished from a maximum disturbance level of the output of the charger. The first predetermined amount may be determined by the accuracy of the regulation loop between the secondary and primary controllers such that the change can be measured.

The apparatus 201 may provide for measurement of the voltage at the output of the charger 102 at least prior to the requested increase and after the requested increase so that the difference can be determined. The secondary controller 201 may include a voltage sensing element, shown as Vsense (abbreviated to Vsns in the Figure) 301, which receives a voltage from a voltage divider 302 connected between the output line of the charger 102 and a reference voltage (e.g. ground). In FIG. 3, the voltage divider 302 is connected to a node along the output line between the transformer 204 and the load switch 211. It will be appreciated that there are numerous ways for the apparatus 100 to gain the measurements for its operation. In one or more examples, the voltage at the output may be determined by measuring the voltage at the VCC pin 304. In one or more examples, the result of the measurement of the output voltage (or current) is provided to the apparatus 201 by another apparatus following a request for the measurement from the apparatus or upon reading a memory location by the apparatus in which the measurement is placed by the other apparatus.

If the apparatus 100 determines that at least the requested increase of the power output of the charger 102 by the first predetermined amount fails to yield an increase in the power output of the charger 102 substantially equal to the first predetermined amount within a threshold, it may be deduced that the charger 102 is disconnected from the mains power supply and the signalling to the electronic device 102 may be provided. The threshold may be used to determine whether or not the actual change on output power (e.g. voltage) is substantially equal to the requested change. Accordingly if the actual change in voltage is outside the threshold amount of the requested change in voltage, then the charger has failed to provide the requested change in output power. The threshold may be less than 90%, 80%, 70%, 60%, 50%, 40%, 30%, 20%, 10% or 5% of the requested change in output power. In this example the threshold is 50%. Thus, as an example, with a 50% threshold or 25 mV threshold, upon a requested voltage change of 50 mV, if the measured resultant voltage output is with 25 mV of the target voltage, the charger is deemed to have successfully provided the requested increase.

In one or more examples, the apparatus 100 may be embodied in the electronic device 101. The apparatus 100 (or other apparatus) may then request an increase in the power output of the charger, using the charging protocol via a message sent via data line 108 to the secondary controller 201. The apparatus 100, in this example, may request a measurement of the voltage at the output of the charger to check for the success or failure of the requested increase using a message sent to the secondary controller 207, the secondary controller 207 configured to reply with the voltage measured at the output of the charger. In one or more examples, the electronic device 101 may measure the voltage at a point within the electronic device 101 to determine whether or not the requested increase in voltage was provided by the charger 102. If there is no increase in voltage substantially equal to the requested voltage increase, the apparatus 100 may provide for providing of an indication to the electronic device to indicate that the charger is disconnected from the mains and thus charging has ceased.

In one or more examples, the requested increase in power output may be effected by control of circuitry in the electronic device 101 rather than by instruction to the secondary controller 201. Thus, where the battery 103 is charged via the DC/DC converter 218 the DC/DC converter may be controlled to increase the current flow. Accordingly, for an apparatus 100 embodied in the secondary controller, a message may be sent to the electronic device for control of the DC/DC convertor. If the apparatus 100 is part of the electronic device, the apparatus may provide for control of the DC/DC convertor 218.

In one or more examples, a combination of an instruction to the secondary controller 201 and control of circuitry in the electronic device may effect the requested increase.

In one or more examples, the apparatus 100 may generate the signalling or provide instruction to another component to generate appropriate signalling so that the electronic device can be made aware of the charging status during direction charging. For example, the apparatus 100 may instruct the secondary controller to send signalling (or cease signalling) over the data line 108. It will be appreciated that the electronic device may be configured to await confirmation of mains disconnection or may be configured to receive regular confirmation of mains connection and await the cessation of said regular confirmation. Thus, the apparatus may provide the indication to the electronic device by providing for sending of a "mains disconnection occurred message" or cessation of regular "mains connection is present messages".

Wherever the apparatus 100 is located, if the requested increase in voltage is subsequently measured as being provided at the output of the charger 102, it may be deduced that the charger 102 is connected to the mains power supply 104. Accordingly, an indication informing the electronic device 101 of a disconnection is not provided. In one or more examples, signalling may be sent that is indicative of the charger 102 being connected to the mains power supply 104.

The method is summarized in FIG. 4 which shows based on a determination of a failure of a request to increase the power output of the charger to the battery of the electronic device 401, the failure comprising where at least a requested increase of the power output of the charger by a first predetermined amount fails to yield an increase in the power output of the charger substantially equal to the first predetermined amount, provide for an indication 402 to the electronic device to indicate that the charger is disconnected from the mains power supply.

FIG. 5 shows a further example of the operation of the apparatus 100. The operation differs in that the power output or, more specifically, the voltage output of the charger 102 is request to be decreased prior to the requested increase described above. This may be desirable to ensure the output current remains within desired bounds should the charger 102 be determined to be connected to the mains power supply 104.

In one or more examples, the success or failure of the requested decrease in the output voltage may be used as an indication of whether the controller 201 is supplied from the battery and therefore the charger is disconnected from the mains or from the output of power converter 200 and therefore the charger is connected to the mains. If it is supplied from the battery 103, the requested decrease will not result in an actual decrease in the power output of the charger. However, the success or failure of the requested decrease may, in one or more examples, only comprise an inconclusive indicator because if the output voltage of 200 is just slightly above the battery voltage (and the charger is still connected to the mains), the requested decrease will not be provided. However, if the requested decrease results in a corresponding actual decrease with a threshold, it may be presumed that the charger is connected to the mains.

Further, in one or more examples, the apparatus 100 may perform the method only in response to the output current of the charger 102 being below a threshold current. As shown in FIG. 3, the secondary controller 201 includes a current sensing element and receives the current to be measured at Isense 303 (abbreviated as Isns in the figures). It will be appreciated that the magnitude of the current may need to be above a certain amount to be accurately determined by the secondary controller 201. The threshold current may be based on a minimum current measurable by the secondary controller 201. The threshold current in this example comprises 100 mA.

Thus, the apparatus 100 may be configured to determine the current flow or receive a measured current flow between the charger 102 and the battery 103 of the electronic device 101 and compare it to the threshold current. In the example illustrated in FIG. 5, if the current flow at the output of the charger 102 is determined 500 to be greater than or equal to 100 mA then the apparatus does not proceed with the reminder of the "mains power supply-charger connection status" determination, as shown at 501. If the current flow at the output of the charger 102 is determined 502 to be less than the current threshold of 100 mA then the apparatus 100 proceeds with the "mains power supply-charger connection status" determination. An optional step 503 of waiting a predetermined period of time, in this example 1 second, is performed, as will be described in more detail below.

The apparatus 100 is then configured to provide for a decrease 504 in the output voltage of the charger 102 by a second predetermined amount. In this example the second predetermined amount is 50 mV, the same as the first predetermined amount described above but it could be different. The decrease in the output voltage may be achieved by providing an instruction to the secondary controller 201 (which may instruct the primary controller 205 via the feedback signal) or by control of circuitry in the electronic device 101 (or a combination of the two).

The voltage at the output of the charger 102 is measured, such as by voltage sensing element 301, at step 505. The apparatus 100 may make the measurement or may receive the measurement from another component that carries out the measuring, as mentioned above. This measured voltage may be stored as $V_{out1}$.

As in the previously described example, the voltage output of the charger 102 is then requested to increase by the first predetermined amount, which in this example comprises 50 mV at step 506. As before, the increase in the output voltage may be achieved by providing an instruction to the secondary controller 201 (which may instruct the primary controller 205) or by control of circuitry in the electronic device 101 (or a combination of the two).

The voltage at the output of the charger 102 is measured, such as by voltage sensing element 301, at step 507. The apparatus 100 may make the measurement or may receive the measurement from another component that carries out the measuring. This measured voltage may be stored as $V_{out2}$.

Step 508 shows a determination of whether or not there was a failure of the request to increase the power output of the charger 102 to the battery 103 of the electronic device 101, the failure comprising where at least the requested increase of the power output of the charger by the first predetermined amount fails to yield an increase in the power output of the charger substantially equal to (i.e. within a threshold) the first predetermined amount. Accordingly, the apparatus 100 may be configured to determine whether or not $V_{out2}=V_{out1}$+first predetermined amount (50 mV).

If the apparatus 100 determines that the output voltage of the charger 102 did increase by substantially the predetermined amount of 50 mV then it deduces that the charger 102 is connected to the mains power supply 104 and the method proceeds to step 503 where there is the wait period before the next requested decrease and subsequent requested increase in the power output of the charger 102. The wait period determines the frequency with which the apparatus 100 provides for checking of mains power supply disconnection of the charger and may be adjusted as required for the particular application.

If the apparatus 100 determines that the output voltage of the charger 102 did not increase by substantially the predetermined amount of 50 mV then it deduces that the charger 102 is disconnected from the mains power supply 104 at step 509. This deduction prompts the apparatus 100 to provide for the indication to the electronic device 101 to indicate that the charger 102 is disconnected from the mains power supply 104.

Accordingly, the electronic device 102 can provide for feedback to a user of the charging status of the electronic device. The feedback may comprise an audible, haptic or visual feedback.

In the above examples, the method is performed with the load switch 211 closed. In one or more examples, the mains disconnection status of the charger 102 may be further verified by the apparatus 100 providing for the opening of the load switch 211.

In one or more examples, this may be advantageous, as if we assume that the output voltage of the converter 200 is equal or just slightly above the battery voltage (while the charger is connected to the mains), the system may falsely presume that the mains is disconnected. Therefore, in one or more examples an extra check is done while the load switch is opened by repeating the above-described requested increase and/or requested decrease. In one or more examples, the apparatus is configured to provide for a requested increase in the output voltage.

Accordingly, an instruction to the secondary controller 201 may be provided by the apparatus 100 to open the load switch 211 once it is deduced (i.e. presumed) the charger 102 is disconnected from the mains power supply 104 by way of the above described method. On opening of the load switch 211, the direct connection between the secondary controller 201 and the battery 103 is interrupted except for via the back gate diode 214 (which may represent a current path through the open load switch rather than an actual diode). The back gate diode 214 introduces a voltage drop in the voltage provided by the battery 103 (assuming no voltage provided by the charger transformer 204). This fall in voltage detected by the voltage sensing element 301, may be used to confirm that the charger is disconnected from the mains power supply 104. The expected voltage drop (i.e. a voltage-drop-threshold) caused by the back gate diode may be known and looked for by the apparatus 100. In other examples, any voltage drop experienced upon opening of the load switch 211 may be determined by the apparatus 100 to be confirmation of the charger 102 being disconnected from the mains power supply. The voltage drop caused by the back gate diode 214, in this example, may be substantially 0.4 V, although it will be appreciated that other voltage drops are possible depending on the configuration of the load switch 211.

Figure 6:
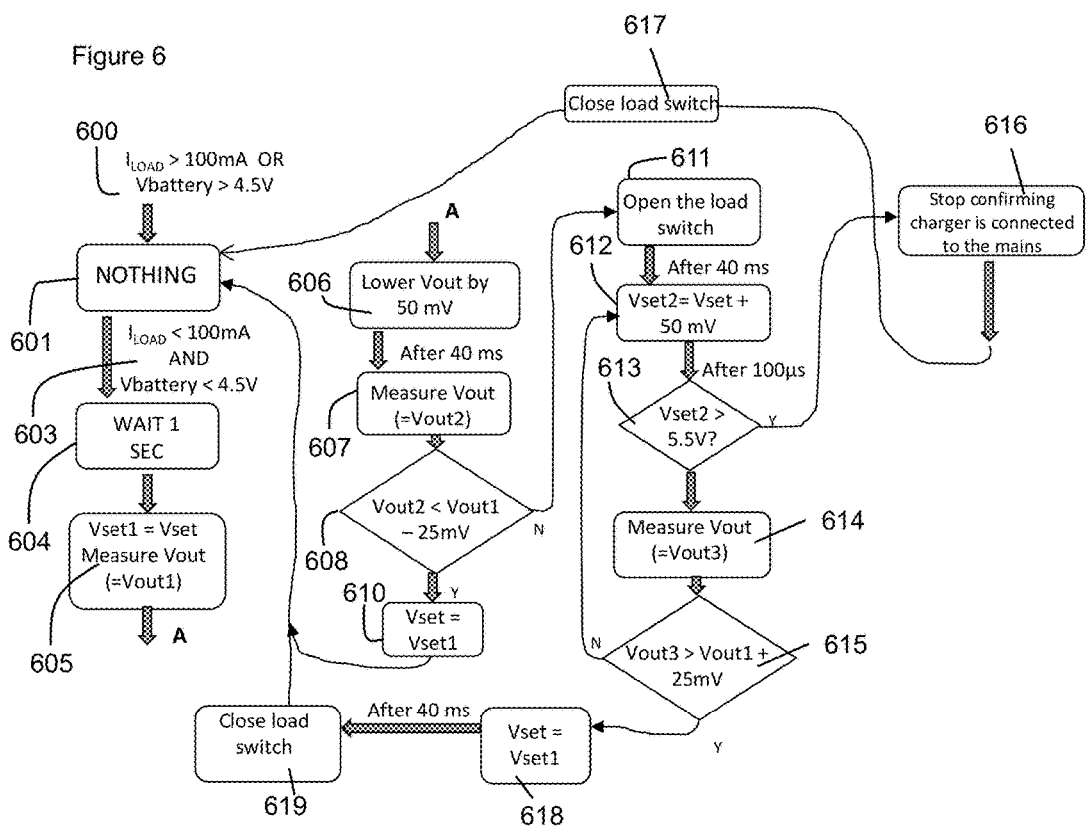
FIG. 6 shows a third flowchart illustrating a second embodiment of the example method.

FIG. 6 shows a further example of the operation of the apparatus 100. Step 600 shows the apparatus providing for determination of whether the current flow at the output of the charger is greater than or equal to the current threshold of 100 mA or when the measured output voltage exceeds the maximum battery voltage in this example 4.5V. If the current flow and the output voltage satisfies this condition then the apparatus does not proceed with the reminder of the "mains power supply-charger connection status" determination, as shown at 601. If the current flow at the output of the charger 102 is determined 603 to be less than or equal to the current threshold of 100 mA then the apparatus 100 further provides for determination of the voltage applied to or provided by the battery is to determined. In this example, the maximum battery voltage is 4.5V. So, if the measured voltage is above this maximum battery voltage, it is presumed that the secondary controller 201 is supplied from the converter 200 (i.e. mains is connected) and not from the battery. If it would be supplied from the battery, the measured voltage will be lower than 4.5V (the maximum battery voltage). Thus, in one or more examples, the apparatus is configured to make the requested increase only if measured voltage is less than a predetermined maximum battery voltage.

The "mains power supply-charger connection status" determination proceeds if the voltage of the battery 103 is less than the maximum battery voltage.

If the voltage of the battery 103 is above the maximum battery voltage or $1_{load}$>100 mA, then the operation returns to step 600. Otherwise the apparatus 100 provides for a wait period 604, which in this example comprises 1 second (other wait periods are possible).

Step 605 shows the current level at which the power converter wishes to regulate the output voltage (Vset) being stored, as variable $V_{set1}$. Further, the voltage at the output of the charger 102, $V_{out}$ is measured (as described above) and stored, as variable $V_{out1}$.

Step 606 shows a requested decrease in the output of the charger 102 by the second predetermined amount (50 mV). This may be achieved by a decrease of $V_{set}$. A wait period (of in this example 40 ms but other periods are possible) is shown between steps 606 and 607). Step 607 shows the measurement of the voltage at the output of the charger 102. This measured voltage is stored as variable $V_{out2}$.

The apparatus 100 is then configured to perform a determination 608 of whether Vout2<Vout1−25 mV. It will be appreciated that Vout2 should be 50 mV lower than Vout1 however the check is a check of a change within a threshold, which comprises 25 mV in this example. If the voltage Vout2 fell to the requested second predetermined amount within the threshold, then the voltage set point $V_{set}$ is returned to the previous value stored as $V_{set1}$ at step 610 and the method returns to step 601.

If the voltage $V_{out2}$ did not fall by more than the requested second predetermined amount plus the threshold, then method proceeds to step 611. At this point the apparatus may provide for opening of the load switch 211 to check a presumption that the charger is disconnected from the mains power supply 104.

After a further wait period (of for example 40 ms) a variable $V_{set2}$ is set to the current voltage output set point of the charger plus the first predetermined amount of 50 mV (different amounts are possible), at step 612.

In summary, steps 612, 613, 614 and 615 form a loop in which the apparatus provides for one or more increases in the output voltage of the converter by increasing Vset in steps of, for example, 50 mV (=Vset2). The apparatus thus continuously tries to increase the output voltage of the converter 200 and checks if the requested increases result in actual increases in the power output of the charger.

At step 613 the apparatus is configured to determine whether $V_{set2}$ is greater than a maximum voltage threshold of, in this example, 5.5V.

At step 614, the current output voltage of the charger 102 being stored as Vout3.

In each iteration of the loop, the apparatus provides for measurement of the output voltage, which is stored as variable Vout3 at step 614 if it indeed was successful in increasing it. In that case it is presumed that the mains is connected.

If the power converter fails to increase the power output by the requested 50 mV, it may be presumed that the mains is disconnected, and the apparatus 100 is configured to continue to try to increase the converter output voltage until it reaches a maximum voltage threshold, which comprises 5.5V (i.e. Vset2>5.5V) at step 613 while still not measuring a resultant increase of the converter output voltage. When the maximum voltage threshold is reached the apparatus 100 has confirmed that the charger 102 is disconnected from the mains the system exits the loop at 616 and stops answering requests of the electronic device. In this example, the electronic device makes repeated requests for confirmation that the mains power supply is connected. If the apparatus stops sending a confirmation that the charger is connected to the mains the electronic device may conclude that the charger is not connected to the mains. It will be appreciated that informing electronic device of the disconnection of the charger from the mains may be implemented by the apparatus by providing signalling to cause the sending a message to the electronic device or by providing signalling (e.g. to another apparatus) to stop sending messages confirming a mains connection.

At step 617, when it is determined that the charger is disconnected the load switch is closed at step 617 and the process proceeds to step 601.

Referring back to the loop defined by steps 612, 613, 614 and 615, step 615 shows that if the output of the charger is successfully increased by the first predetermined amount within a threshold (25 mV), the voltage output of the charger is returned, at step 618, to the value stored as Vset1 and the load switch is closed at step 619. The method returns to step 601 on presumption that the charger is connected to the mains power supply.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations. Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. disc, memory, signal).

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising:
   wherein the apparatus is configured to be coupled to a charger;
   wherein the charger is configured to receive a mains power supply and, when the charger is connected to an electronic device, provide a power output to charge a battery in the electronic device;
   wherein,
      based on a determination of a failure of a requested increase the power output, the failure comprising wherein at least the requested increase of the power output of the charger by a first predetermined amount fails to yield an increase in the power output equal to the first predetermined amount within a threshold amount,
      the apparatus is configured to provide an indication to the electronic device that the charger is disconnected from the mains power supply.

2. An apparatus according to claim 1,
   wherein the power output to charge the battery is controlled by a controller coupled to the charger, and the requested increase comprises a requested increase from the apparatus to the controller.

3. An apparatus according to claim 1,
   wherein the requested increase is effected by control of the electronic device, by the apparatus, to increase a draw of current thereto.

4. An apparatus according to claim 1,
   wherein the indication is based on a requested decrease of the power output by a second predetermined amount, followed by the requested increases; and
   wherein the apparatus is configured to provide the indication based on determination that the power output fails to increase substantially by the first predetermined amount from a first power output measured after the requested decrease to a second power output measured after the requested increase of the power output.

5. An apparatus according to claim 4,
   wherein the first predetermined amount and the second predetermined amount are the same.

6. An apparatus according to claim 4,
   wherein the requested decrease and requested increase are performed periodically.

7. An apparatus according to claim 4,
   wherein the apparatus is configured to perform one or more of;

where the power output to charge the battery is controlled by a controller of the charger, the requested decrease comprises a requested decrease to the controller; and the requested decrease is effected by control of the electronic device to decrease a draw of current thereto.

8. An apparatus according to claim 4, wherein the first power output measured after the requested decrease comprises a voltage measurement and the second power output measured after the requested increase comprises a voltage measurement.

9. An apparatus according to claim 1, wherein the apparatus forms part of the charger.

10. An apparatus according to claim 1, wherein the apparatus forms part of the electronic device.

11. An apparatus according to claim 1, wherein the apparatus is configured such that the determination of the failure of the request to increase the power output of the charger is performed in response to a measured current flow between the charger and the battery of the electronic device being below a threshold current.

12. An apparatus according to claim 1, wherein following the determination of the failure of the request to increase the power output of the charger to the battery of the electronic device, the apparatus is configured to provide the indication based on a detected voltage drop of at least a predetermined voltage-drop-threshold upon opening of a load switch that interrupts a connection between the charger and the battery.

13. An apparatus according to claim 1, wherein the indication is either, a message provided to the electronic device indicative of the charger being disconnected from the mains power supply, or cessation of one or more messages provided to the electronic device indicative of the charger being connected to the mains power supply.

14. An apparatus configured to, in respect of an electronic device comprising a battery for powering the electronic device and a charger configured to receive a mains power supply and, when connected to the electronic device, provide a power output to charge the battery, based on a determination of a failure of a requested increase the power output of the charger to the battery of the electronic device, the failure comprising where at least the requested increase of the power output of the charger by a first predetermined amount fails to yield an increase in the power output of the charger equal to the first predetermined amount within a threshold amount, provide an indication to the electronic device that the charger is disconnected from the mains power supply for causing the electronic device to indicate that the charger is disconnected from the mains power supply to a user of the electronic device;

wherein the provision of the indication is further based on a requested decrease of the power output of the charger by a second predetermined amount, followed by the requested increase; and wherein the apparatus is configured to provide the indication based on determination that the power output of the charger fails to increase substantially by the first predetermined amount from a first power output measured after the requested decrease to a second power output measured after the requested increase of the power output;

wherein the first power output measured after the requested decrease comprises a voltage measurement and the second power output measured after the requested increase comprises a voltage measurement.

15. An apparatus configured to, in respect of an electronic device comprising a battery for powering the electronic device and a charger configured to receive a mains power supply and, when connected to the electronic device, provide a power output to charge the battery, based on a determination of a failure of a requested increase the power output of the charger to the battery of the electronic device, the failure comprising where at least the requested increase of the power output of the charger by a first predetermined amount fails to yield an increase in the power output of the charger equal to the first predetermined amount within a threshold amount, provide an indication to the electronic device that the charger is disconnected from the mains power supply for causing the electronic device to indicate that the charger is disconnected from the mains power supply to a user of the electronic device;

wherein following the determination of the failure of the request to increase the power output of the charger to the battery of the electronic device, the apparatus is configured to provide the indication based on a detected voltage drop of at least a predetermined voltage-drop-threshold upon opening of a load switch that interrupts a connection between the charger and the battery.

* * * * *